May 29, 1956 J. O. BEAUMONT 2,747,797

ROTATIONAL ANALOGUE-TO-DIGITAL CONVERTERS

Filed Aug. 20, 1951 4 Sheets-Sheet 1

INVENTOR.

JAMES O. BEAUMONT.

BY

Seymour M. Rosenberg

Atty.

May 29, 1956 J. O. BEAUMONT 2,747,797

ROTATIONAL ANALOGUE-TO-DIGITAL CONVERTERS

Filed Aug. 20, 1951 4 Sheets-Sheet 2

INVENTOR.
JAMES O. BEAUMONT.
BY
Seymour M. Rosenberg
Atty.

ROTATIONAL ANALOGUE-TO-DIGITAL CONVERTERS

INVENTOR.
JAMES O. BEAUMONT.
BY
Seymour M. Rosenberg
atty

INVENTOR.
JAMES O. BEAUMONT.
BY
Seymour M. Rosenberg
atty.

United States Patent Office 2,747,797

Patented May 29, 1956

2,747,797

ROTATIONAL ANALOGUE-TO-DIGITAL CONVERTERS

James O. Beaumont, Los Angeles, Calif., assignor, by mesne assignments, to Hughes Aircraft Company, a corporation of Delaware Application August 20, 1951, Serial No. 242,598

16 Claims. (Cl. 235—61)

The present invention relates to rotational analogue-to-digital converters and more particularly to rotational analogue-to-digital converters for converting angles of shaft rotation into a digital number representing the magnitude of a function of the angle.

One form of converter of the prior art is a converter which indicates the angle of shaft rotation in the form of a binary digital number, and is known in the art as a "binary protractor." The basic element of the protractor is an optical mask calibrated with transparent and opaque areas, the transparent areas being so arranged as to indicate angles in the form of a binary number. Generally, the mask is in the form of a disk adapted to be fixed to the shaft whose rotational angle is to be measured. The disk or mask has a series of concentric rings, each ring provided with alternate transparent and opaque areas, the outer ring representing the least significant digit and progressively inner rings representing successively more significant digits. In operation, a light source is positioned on one side of the mask or disk, and a photosensitive device is positioned on the other side of the disk to view the disk along one radial scan line thereof. As the shaft and disk rotate, the response of the photosensitive device at any instant is proportional to the magnitude of a function of the rotational angle with respect to a predetermined reference line. By connecting the photosensitive device to a counting device, the output of the counting device will be a binary number corresponding to the function of the rotational angle.

One of the primary disadvantages of this type of protractor is its inherent ambiguity during the interval of transition from one digital number to the next. Thus, during the transition interval, the elements of the photosensitive device representing the various place digits will not change simultaneously, and an erroneous reading will result. Furthermore, if there is any discrepancy in the pattern on the disk or any eccentricity of the disk with respect to the shaft, the responses of the components of the photosensitive device will be varied, and the indicated number will be in error.

The present invention discloses a binary protractor of the optical type which utilizes a well-known property of the binary number system to overcome the above and other disadvantages of the prior art. According to the basic principles of the present invention, a single photosensitive element is employed to indicate the least significant digit of the binary number, while first and second selectively operable photosensitive devices are utilized to indicate the other digits of the number. The first and second photosensitive devices are so arranged, with respect to each other, that during the transition interval between binary numbers, the first device indicates all but the least significant digit of the next higher number, while the second device indicates all but the least significant digit of the next lower number.

Now, it is a well-known property of the binary number system that whenever the least significant digit of a number is "1," all of the other digits of the number have the same value as those of the next lower number, while whenever the least significant digit is a "0," all of the other digits have the same value as those of the next higher number. Utilizing this property, means are provided to selectively render operable one of the first and second photosensitive devices in accordance with the actuation of the single element representing the least significant digit of the number.

According to one embodiment of the invention, the first device is positioned slightly ahead of the scan line to indicate the digits of the next higher number, while the second device is positioned slightly behind the scan line to indicate the digits of the next lower number. The first device is normally operable and the second device is normally inoperable. However, upon energization of the single element representing the least significant digit, the first device is automatically rendered inoperable, while the second device is simultaneously rendered operable.

With the binary protractor of the present invention, the maximum possible reading error at any instant is equal to one-half the value of the least significant digit. Furthermore, should the pattern of one or more rings be slightly misaligned with respect to the alignment of the other ring patterns, and the scan line, because of eccentricity or pattern irregularity, the accuracy of indication will not be affected. Still further, a minimum number of additional components are required, and the resolution power of the system remains the same as that of the prior art systems.

The same principle of operation is utilized in another embodiment of the present invention in which each element of one of the photosensitive devices is displaced from the scan line a different amount than the other elements of the device. More particularly, each element may be displaced from the scan line an amount proportional to $2n$ times the significance or value of its corresponding place digit, where $n$ is an integer. Thus, assuming $n$ is chosen as 1, the "twos" place digit element of the device would be displaced an amount proportional to four digits, while the "fours" digit component is displaced an amount proportional to eight digits, etc. The element of the other photosensitive device may be displaced like amounts, or may be displaced by the amount of displacement of the photosensitive device of the first embodiment. In this manner, the individual elements of the photosensitive devices need not be positioned in close proximity with each other, as in the first embodiment of the invention.

The same result may be achieved, according to still another embodiment of the invention, by employing an optical system, between the disk and the photosensitive devices, for directing the illumination to the proper elements of the photosensitive devices. In this manner, the photosensitive devices may be positioned at any desired remote position without interfering with the operation of the converter.

The present invention further discloses an additional modified embodiment applicable to producing digital indications of a desired function of the rotational angle to be measured. Thus, this latter embodiment may be utilized to present in digital form a trigonometric function of the rotational angle.

Although the invention will be described with particular reference to binary converters of the optical type, it is equally applicable to converters employing forms of energy other than light. In general, the invention is applicable to any binary converter system which employs a source of energy, an indicating device responsive to the energy from the source, and means for directing the energy from the source to the indicating device in accordance with the digits of the binary number to be represented. Accordingly, in order to illustrate its general applicability, the present invention discloses several modifications of the first embodiment, in which sources of energy other than light are employed.

It is, therefore, an object of the present invention to provide a rotational analogue-to-digital converter which substantially eliminates the possibility of an anomalous indication during the transition periods between one digital number and another.

Another object is to provide a rotational analogue-to-digital converter which continuously and accurately presents the rotational angle in binary digital form.

A further object is to provide a binary protractor in which the magnitude of the angle is presented by one of two indicating devices, depending upon the value of the least significant digit of the binary number corresponding to the magnitude of the angle.

Still another object is to provide a binary protractor employing a pair of indicating devices and means for selectively actuating one of said devices to present the rotational angle in proper binary form.

An additional object is to provide a binary protractor employing a pair of indicating devices and means for selectively actuating one of said devices in accordance with the magnitude of the least significant digit of the binary number representing the angle to be measured.

A still further object is to provide an indicating apparatus for a binary protractor, said apparatus including first and second indicating devices for presenting all but the least significant digit of the next higher and next lower number, relative to the number to be indicated, said devices being actuable in accordance with the magnitude of the least significant digit of the binary number to be indicated.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
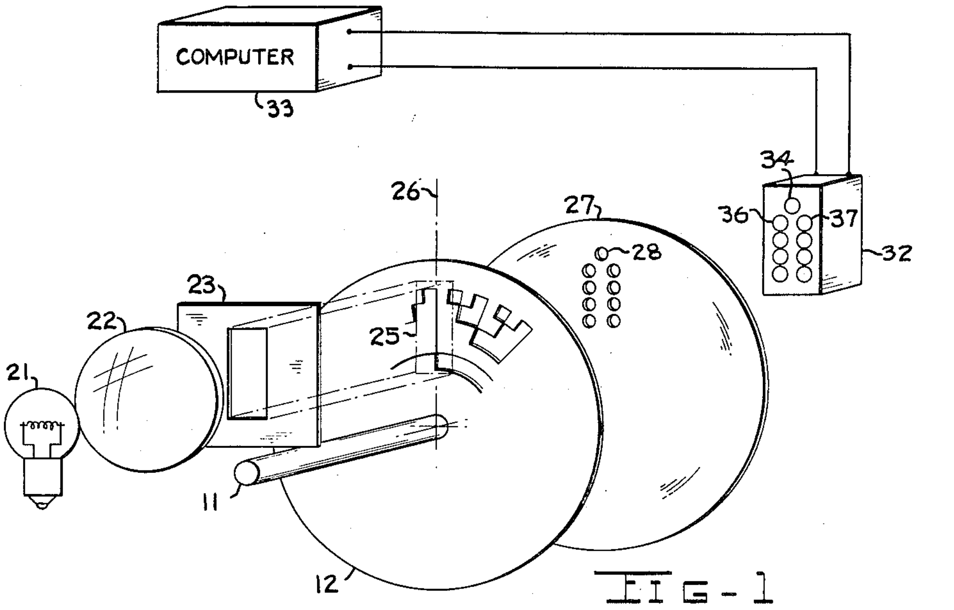
Fig. 1 is a schematic diagram of one embodiment of the present invention.

Referring now to the drawings, there is shown in Fig. 1 one embodiment of a binary protractor, according to the present invention, for measuring the angle of shaft rotation of a shaft 11. Fixedly secured to shaft 11 for rotation therewith is a mask or disk 12. In actual practice, shaft 11 may be the shaft whose angular rotation is to be measured, in which event disk 12 may be press-fitted over shaft 11 in any conventional manner. On the other hand, shaft 11 may be considered as the input shaft of the protractor, to which is coupled in any conventional manner the device whose rotational angle is to be measured.

Figure 2:
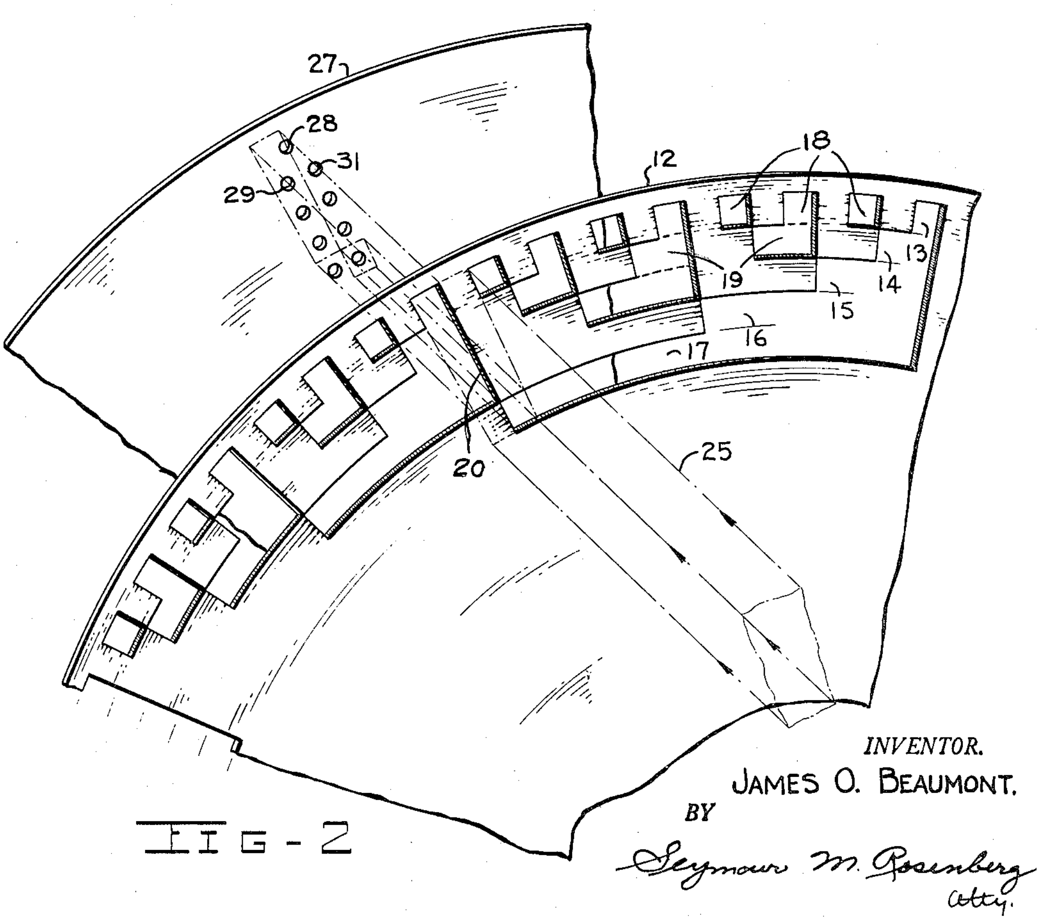
Fig. 2 is a perspective view of a portion of the disk and mask of Fig. 1.

Disk 12 includes a plurality of concentric rings, five of which are shown in Fig. 2 and designated 13 through 17, respectively. Each of rings 13 through 17 is provided with alternate optically transparent and opaque areas, as shown in Fig. 2, the widths of the areas being progressively greater for the inner rings. Ring 13 represents the least significant, or the "ones" digit of the binary number system, and the width of each transparent area, such as area 18, represents the increment associated with the least significant digit. Ring 14 represents the next significant or "twos" digit of the system, and the width of each area of ring 14, such as area 19, is twice the width of area 18. Similarly, rings 15, 16 and 17 represent the "fours," "eights," and "sixteens" digits of the binary number system. It is thus seen that the highest number that can be read on the sector of disk 12 illustrated in Fig. 2 is 31.

In actual practice, disk 12 may be provided with as many rings as desired, in order to divide the rotational angle into as many parts as desired. Thus, the sector of disk 12 shown in Fig. 2 may be considered to be $\frac{1}{32}$ of the total area of disk 12 so that the smallest angular increment measured by disk 12 is $\frac{1}{1024}$ of a revolution. In this case, five additional inner rings would be placed on disk 12. Obviously, any other number of rings may be used, and it is, therefore, to be understood that the invention is not limited to the particular configuration shown in the drawings.

Referring again to Fig. 1, a light source 21 is positioned on one side of disk 12. The illumination from source 21 is concentrated, by a lens 22 and a mask 23 having a rectangular slit therein, in order to direct the illumination from source 21 in the form of a rectangular beam 25 on disk 12. The vertical axis 26 of beam 25 extends perpendicular to the axis of rotation of shaft 11 and disk 12, and constitutes the radial scan line of the protractor.

It should be understood, of course, that the beam-forming elements shown in Fig. 1 are merely illustrative of one mode of carrying out the present invention, and are not intended to limit the scope of the invention. Thus, beam 25 may be formed directly from a rectangular beam source. Furthermore, although a rectangular beam is preferred, it is clear that beams of other shapes, such as circular or elliptical, may be utilized, without departing from the spirit and scope of the invention.

Positioned on the side of disk 12 opposite that of source 21 is a fixed mask 27 which is opaque to the illumination from source 21, except for a plurality of transparent areas therein. The transparent areas of mask 27 are indicated as circles in Figs. 1 and 2, although it is clear that they may take any desired shape. As shown in Fig. 1, mask 27 may be disk-shaped and of the same size as disk 12, in order to block all of the illumination from source 21 passing through disk 12, except for the portions thereof directed toward the transparent areas of mask 27.

The transparent areas of mask 27 bear a definite relationship to radial scan line 26 and to the rings of disk 12, as clearly shown in Fig. 2. Area 28 of mask 27 is aligned with scan line 26 and ring 13 of disk 12, so that only the illumination representing the "ones" digit passes through area 28. Areas 29 and 31 are aligned with ring 14 and equally displaced to the left and right, respectively, of scan line 26. Similarly, a pair of transparent areas are aligned with each of rings 15 through 17, one area of each pair being aligned with area 29, and the other area being aligned with area 31. The displacement of areas 29 and 31 from scan line 26 may be any fraction of the width of area 18 of ring 13. In practice, the displacement is chosen as one-half the width of area 18, so that the spacing between the center lines of areas 29 and 31 is equal to the width of area 18.

A photosensitive device, generally designated 32 in Fig. 1, is positioned beyond mask 27 and is electrically connected to the input register of a computer. The particular computer used forms no part of the present invention and is shown in block form in Fig. 3 merely for the purpose of clarity of operation. Device 32 may be any means responsive to illumination for applying electrical signals to the input terminals of computer 33. One suitable form of device 32, together with computer 33, is shown in Fig. 3.

Figure 3:
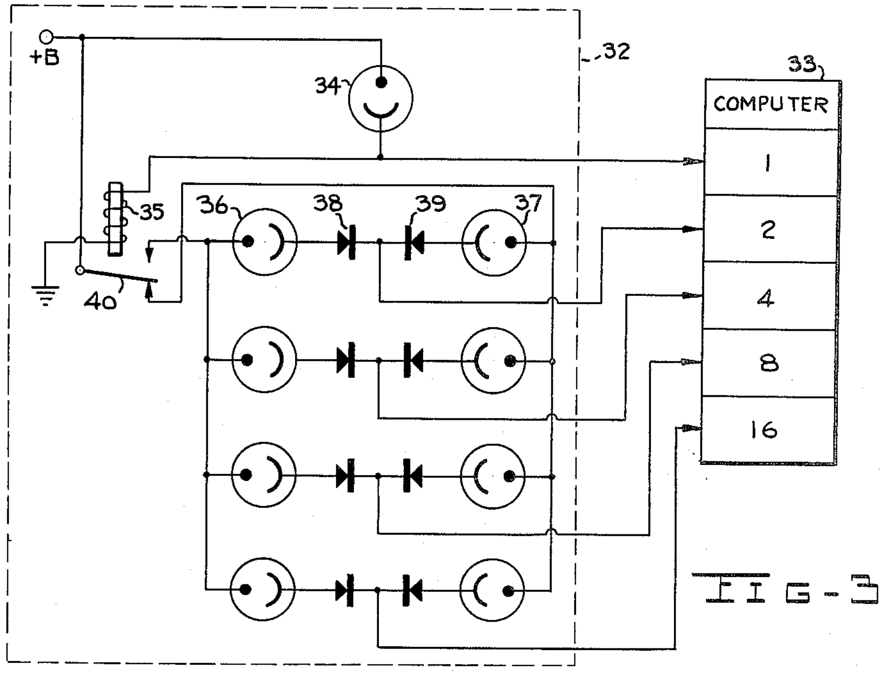
Fig. 3 is a circuit diagram of one form of indicating apparatus for use in the embodiment of Fig. 1.

Referring now to Fig. 3, photosensitive device 32 comprises a first photoelectric cell 34 having its plate connected to the +B terminal of a source of direct current potential, not shown, the negative terminal of the source being grounded. Cell 34 is aligned with transparent area 28 of mask 27, as shown in Fig. 1. The cathode of cell 34 is connected to the 1 counting section of the input register of computer 33 and to one terminal of a relay coil 35 which has its other terminal grounded. Device 32 further comprises a first pair of photoelectric cells 36 and 37 having their cathodes coupled through isolating rectifiers 38 and 39, respectively, to the 2 counting section of the input register of computer 33. Cells 36 and 37 are aligned with transparent apertures 29 and 31, respectively, as shown in Fig. 1. Similar pairs of photoelectric cells and rectifiers, not designated, are provided for the 4, 8 and 16 counting sections of the input register of computer 33.

Relay coil 35 is arranged to move armature 40 upward, as viewed in Fig. 3, in order to apply the +B potential to the left bank of photoelectric cells, including cell 36. Armature 40 is normally held in the position shown in Fig. 3, so that the +B potential is applied to the right bank of photoelectric cells, including cell 37. It is thus seen that when cell 34 is energized to record a "one" in the input register, the left bank of cells will be actuated, while the right bank of cells will be actuated when cell 34 is not energized and a "zero" is recorded in the 1 counting section of the register.

It should be apparent that the relay illustrated in Fig. 3 is merely one means of selectively actuating the banks of cells in response to energization of cell 34, and that other means may be substituted therefor without departing from the spirit and scope of the present invention. For example, where it is desired to eliminate mechanical movement, a multivibrator circuit controlled from cell 34 may be utilized. One suitable circuit is illustrated in Fig. 5-29 at page 182 of volume 19 of the M. I. T. Radiation Laboratory Series, entitled "Waveforms," published in 1949 by McGraw-Hill Book Company, Inc., and which is hereby incorporated by reference in this application. With this circuit, the left bank of cells would be connected to the plate of $V_1$, and the right bank of cells to the plate of $V_2$.

Considering now the operation of the protractor of Fig. 1, it should be recalled that the magnitude of the least significant digit in the binary number system is indicative of the relationship between the number and either the immediately preceding (next lower) or the immediately succeeding (next higher) binary number. Thus, as seen from disk 12 of Fig. 2, if the least significant digit is a "one," each of the other digits of the number has the same value as the corresponding digit of the next lower binary number. On the other hand, if the least significant digit is a "zero," each of the other digits of the number has the same value as the corresponding digit of the next higher number. Accordingly, by employing two banks of cells, displaced from scan line 26, an accurate reading may be obtained for all of the digits but the "ones" digit. Thus the maximum possible error in the protractor of Fig. 1 is one-half of one unit, even if disk 12 has been rotated to a position where scan line 26 is in the transition region between two numbers on disk 12.

However, assume that scan line 26 is in the transition region 20 between the numbers 15 and 16 of disk 12, as shown in Fig. 2. If mask 27 of Fig. 1 contained a single group of transparent areas aligned with scan line 26, and if device 32 included a single bank of cells aligned with the transparent areas of mask 27, the possibility of an error in the count recorded in the register is apparent. In each counting section of the register, the reading may be zero or the significant digit, depending upon the sensitivity of the associated cell, the actual alignment of the areas of mask 27 and scan line 26, and the alignment of disk 12 and scan line 26. Thus, the actual reading under these conditions, may be any number from zero to 31. Even if close tolerances are observed for each of the elements of the protractor, the possibility of an error still exists, particularly after prolonged usage of the protractor.

More particularly, in the assumed transition region 20 between the numbers 15 and 16, the binary count stored in the register is 01111 while the binary count to be stored is 10000. In other words, the digit stored in each section of the register is to be reversed during the transition region between the numbers 15 and 16. However, for any of the reasons pointed out above, it is assumed that the sections of the register do not change simultaneously. For example, if the "sixteens" place digit were to change first, the binary count stored in the register at this instant would be 11111, or equivalent to the number 31. On the other hand, if all but the "sixteens" place digit changed simultaneously, the resulting instantaneous count would be 00000.

It would be possible to so arrange the protractor as to produce no readings during the transition regions, in order to eliminate the ambiguity. However, the inherent limitations of this expedient become particularly apparent when the protractor is utilized in a dynamic system to provide readings of the instantaneous position of the rotating object. In this case, the reading may be a zero at the precise point of measurement. Furthermore, the employment of this expedient would require additional circuitry and would increase the required resolution power of the protractor.

On the other hand, with the protractor of the present invention, instantaneous readings may be obtained under all conditions, without any increase in required resolution power. Under the assumed conditions shown in Fig. 2, selective actuation of banks of cells depends upon the reading in the 1 counting section of the register. Thus, if the illumination passing through ring 13 of disk 12 and area 28 of mask 27 is sufficient to energize cell 34, a "one" will be recorded in the 1 counting unit of the register, and relay coil 35 will be energized. The left bank of cells will be actuated and, since these cells are positioned squarely in alignment with illuminated areas of the rings of disk 12, the number read will be 15. If cell 34 had not been energized, a "zero" would have been recorded in the 1 counting section, and the right bank of cells would have been actuated. Accordingly, only the cell associated with ring 17 would be energized and the number recorded would be 16.

Figure 4:
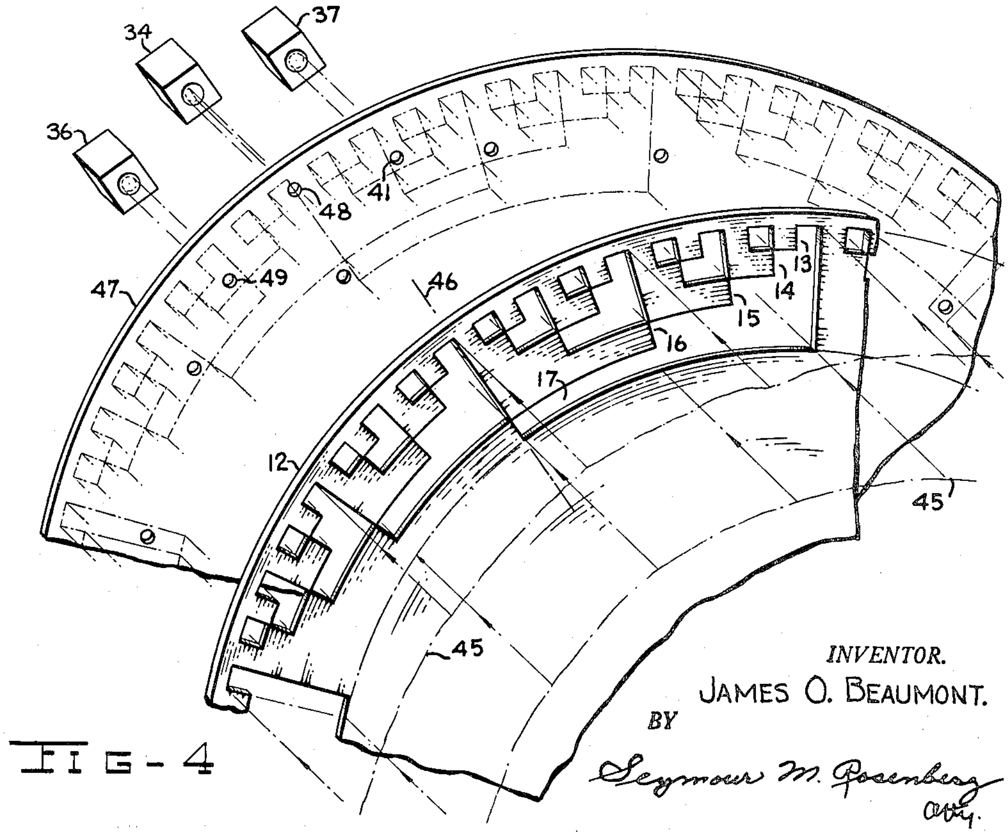
Fig. 4 is a perspective view of portions of a modified mask, together with the disk and the photosensitive device.

In some instances, it may be undesirable to position the cells as close together as contemplated in the embodiment of Fig. 1. This undesirable result may be avoided by either displacing the cells relative to each other, or displacing the rings of the disk relative to each other. In Fig. 4, there is shown a modified arrangement of the mask and photoelectric cells, in which the cells may be positioned at points spaced apart a distance greater than the width of one area of the disk.

Referring now to Fig. 4, a mask 47 is positioned behind a disk 12 which is identical with disk 12 of Figs. 1 and 2. Disk 12 is irradiated by a light beam 45 which has a greater cross-sectional area than that of beam 25 of Figs. 1 and 2. Mask 47 is provided with a first transparent area 48 aligned with ring 13 of disk 12 and vertical axis 46 of beam 45. Mask 47 also is provided with a pair of transparent areas 49, 41, aligned with ring 14 of disk 12, and displaced equidistantly from axis 46. Similarly, a pair of spaced transparent areas are provided in mask 47 for each of rings 15, 16 and 17 of disk 12.

Considering now the possible displacements between each pair of transparent areas of mask 47, it can be seen that the pattern in each ring of disk 12 is repetitive, and that any point in a ring has a plurality of corresponding points on the same ring. For example, considering ring 14, it will be observed that if the sector of disk 12 shown in Fig. 4 is uniformly illuminated, the amount of illumination reaching any point on mask 47 aligned with ring 14 will be the same as that received at any other aligned point on mask 47 spaced from the first point a distance equal to $2nS$, where $n$ is an integer and S is a width equivalent to the significance or value of the digit. In ring 14, S is equal to twice the width of area 18 of ring 13.

Accordingly, if, for example, areas 41 and 49 are displaced from areas 31 and 29, respectively, of Fig. 2, distances equal to $4n$ times the width of area 18, the resultant illumination will be the same. Stated differently, if areas 49 and 41 are spaced apart a distance equal to nine times the width of area 18, mask 47 will perform the same function as mask 27 of Figs. 1 and 2. In this instance, $n$ would be chosen as one. Similarly, the spacings between the transparent areas of mask 47 associated with rings 15 and 16 may be 17 and 33 times the width of area 18, respectively. On the other hand, one of the areas associated with ring 17 may be in the same position as the corresponding area in Fig. 2. This arrangement is shown in Fig. 4.

In Fig. 4, the photoelectric cells, such as cells 34, 36 and 37, are positioned in alignment with their respective areas of mask 47. The mode of operation of the modified protractor of Fig. 4 is identical with that of the protractor of Fig. 1. The protractor of Fig. 4 has an advantage over that of Fig. 1 in that the various cells may be separated by sufficient distances to prevent interaction between the cells, and to enable the use of larger cells where desired.

Figures 5, 6:
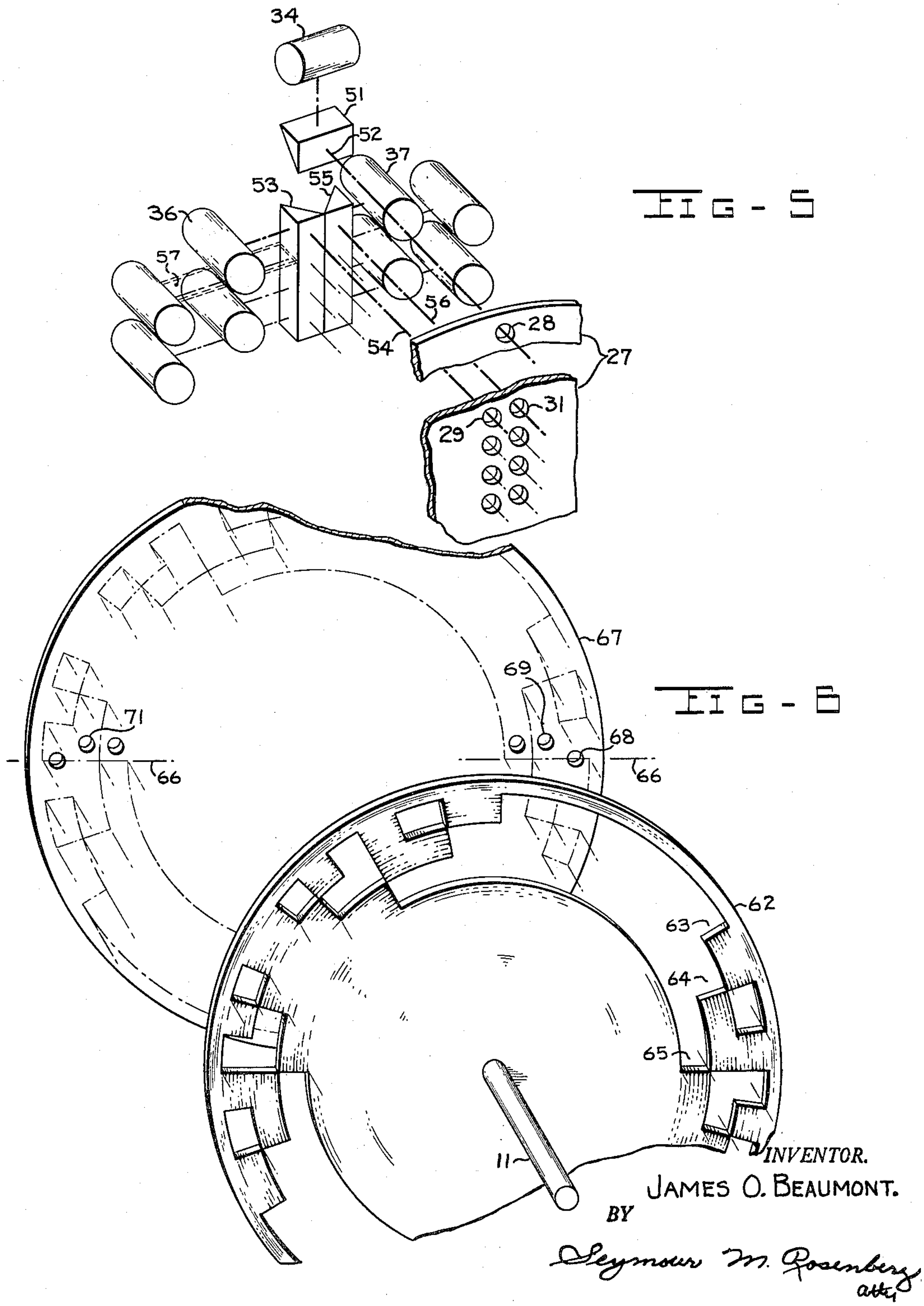
Fig. 5 is a perspective view of a modified indicating apparatus.
Fig. 6 is a perspective view of portions of a modified disk and a modified mask for use in indicating trigonometric functions.

Referring now to Fig. 5, there is shown another modification of the present invention employing an optical system, this modification permitting any desired distribution of the photoelectric cells. In Fig. 5, there are shown only those components of the protractor of Fig. 1 which have been modified, together with their structural connections. A portion of a mask, identical with mask 27 of Fig. 1, is shown as being provided with a plurality of transparent areas, such as areas 28, 29 and 31. Positioned behind mask 27 and in alignment with area 28 is an optical reflector, such as a prism 51, arranged to direct light rays passing through area 28, such as ray 52, to a photoelectric cell corresponding to cell 34 of Fig. 1, and designated alike.

A second optical prism 53 is positioned behind mask 27 in alignment with the left group of transparent areas of mask 27, as viewed in Fig. 5. Prism 53 is arranged to direct the light rays passing through each area of the left group to the appropriate photoelectric cells which may be positioned as desired. For example, prism 53 directs the light rays passing through area 29, such as ray 54, to a cell corresponding to cell 36 in Fig. 1 and so designated. Similarly a prism 55 directs the light rays passing through the right group of transparent areas of mask 27, such as ray 56 from area 31, to the appropriate cell, such as cell 37.

Obviously, the prisms shown in Fig. 5 are merely illustrative of one form of optical arrangement which permits the desired distribution of the photoelectric cells, and any other optical arrangement which accomplishes substantially the same result is contemplated by the present invention. For example, a single prism may be used for all the required reflections, or other forms of reflectors, such as mirrors, may be utilized. On the other hand, the optical system may employ elements exhibiting other light deflecting properties, such as refraction. Furthermore, in some instances, it may be desirable to isolate the rays passing through the various areas from each other and from the cells. This result may be accomplished by means of light shields, such as shield 57, positioned between the cells, or between the various paths of the rays, or both.

It is thus seen that the present invention provides a rotational analogue-to-digital converter for optically converting angles of shaft rotation into digital numbers, the converter eliminating the ambiguity inherent in the prior art structures. This result is attained without increasing the required resolution power of the converter, and with the addition of a minimum number of components. Furthermore, since the selection of the number is performed automatically by a circuit of the type illustrated in Fig. 3, the converter of the present invention does not interfere with any other operations of the computer to which the number is applied, and will present continuously the instantaneous value of the angle.

Although the invention has been described, thus far, in connection with a converter for indicating the magnitude of the rotational angle, it is clear that the converter may be utilized to indicate functions of the angle, such as trigonometric functions. For example, disk 12 of Fig. 1 may be calibrated so as to represent in binary digital form the magnitude of the sine or cosine of the rotational angle. If disk 12 is divided into 4096 sectors, that is, four times the number of sectors set forth above, it can be shown that the maximum variation of the function between sectors has a value of two in the last significant digit. Over a wide range of sectors, the variation is only one or zero. Accordingly, it is clear that the accuracy of the converter of the present invention will be extremely high, even when utilized to present sine or cosine functions.

Where a higher degree of accuracy is desired, disk 12 may be calibrated in a different manner so as to present only increments of one in the least significant digit of the binary number. Although the width of the sectors of a disk calibrated in this manner will not be uniform, this arrangement has the advantage of uniform increments which renders the mode of operation of the converter of Fig. 1 applicable thereto. Furthermore, since trigonometric functions are duplicated in each 180 degree sector, the cells of each group may be separated from the corresponding cells of the other group without the use of an optical system.

Referring now to Fig. 6, there is shown an approximately 180 degree sector of a disk 62 suitable for use in computing the sine or cosine of the rotational angle. In Fig. 6, the calibrations represent the values of the function $f(a)=7\sin(a)=7\cos(90-a)$, where $a$ is the rotational angle. The function is plotted to the nearest unit number, for example $f(30°)=4$, as shown in Fig. 6. Although only three digital rings 63, 64 and 65 are shown on the disk of Fig. 6, it should be apparent that the disk may be provided with any number of rings, in order to increase the accuracy of the converter. For example, a disk with the same number of rings as disk 12 of Figs. 1 and 2 may be used in which case the function represented would be $f(a)=1023\sin a$. Similarly, the number of sectors of the disk may be selected at any desired value.

As in the previous embodiments, a mask 67 is positioned behind disk 62, mask 67 being provided with a plurality of light transparent areas, such as areas 68, 69 and 71. Area 68, which is aligned with ring 63, is also aligned with the radial scan line which is shown at 66 in Fig. 6. Area 69, which is aligned with ring 64, is spaced counterclockwise of scan line 66, as viewed in Fig. 6, a distance equal to one-half the width of the units area of ring 63. Area 71 is also aligned with ring 64. However, instead of positioning area 71 in proximity with area 69, as in Fig. 1, area 71 is displaced clockwise of the other end of scan line 66 a distance equal to one-half the width the units area of ring 63. This displacement of area 71 is possible, since the absolute values of sin ($a$) and sin ($180-a$) are equal. Accordingly, no positional difficulty arises in the distribution of the transparent areas in a trigonometric function protractor, as shown in Fig. 6. The transparent areas associated with ring 65 of disk 62 are arranged in a manner similar to the arrangement of areas 69 and 71.

The operation of the protractor including the disk and mask of Fig. 6 is identical with the operation of the protractor of Fig. 1, except that the digital numbers represent sine functions of the rotational angle. Where it is desired to measure cosine functions, it is merely necessary to shift disk 62 through a 90 degree angle relative to scan line 66, since cos $(90-\alpha)$ is equal to sin $\alpha$. Other trigonometric functions may be measured by the protractor of the present invention by providing a disk calibrated with the desired function, in a manner simlar to that used in connection with the sine and cosine functions.

It should be understood, of course, that the drawings are merely illustrative of the schematic arrangement of the components of the protractor of the present invention, and that the actual arrangement of the components may take various configurations. For example, all of the components may be enclosed in a single housing, with shaft 11, or a shaft coupling extending from the housing. With this arrangement, the mask may be merely a partition in the housing provided with suitable apertures. Again, the mask need not be of the same configuration as that of the disk, so long as extraneous light is prevented from reaching the photosensitive device. This result may be attained by providing light shields, as shown in Fig. 5, or by providing a system of projection lenses to direct the illumination from the transparent areas to the photosensitive device. In addition, a simple light source which completely illuminates the calibrated disk may be utilized, so long as the rays reaching the photosensitive device are properly directed. Furthermore, instead of employing an illumination transmitting member, the system of the invention will perform equally as well with an illumination reflecting member as the calibrated disk. Thus, by coating the back of any of the disks previously described, and positioning the photosensitive devices in the path of the reflected illumination, an equivalent system may be obtained.

No specific material has been mentioned for either the disk or the mask, since the material used may depend upon the properties of the source. Thus, if a monochromatic light source is utilized, the mask and disk would have to be impervious to the particular color of the source. It is considered, however, that because of the high number of sectors used and the repetitive pattern on the disk, the disk may be produced more efficiently by photographic methods. For example, only one sector, such as the sector shown in Fig. 2, need be drawn or etched, and the disk may be prepared from a composite of multiple photographic exposures of the one sector. In the case of trigonometric functions, the disk would be composed of four exposures of a single quadrant.

It is thus seen that the present invention discloses a non-ambiguous binary protractor of the optical type which includes a photosensitive element for indicating the least significant digit of the binary number to be indicated, and first and second photosensitive devices for indicating all but the least significant digit of the next higher and next lower binary numbers, respectively. In the absence of energization or actuation of the element, the first device is operable and the second device is inoperable. However, upon actuation of the element, the first device is rendered inoperable and the second device is rendered operable. In this manner, the protractor of the present invention continuously presents an accurate indication of all but the least significant digit of the binary number to be indicated.

Although the calibrated member has been illustrated as being in the form of a disk rotatable past the scan line, it should be clear that the member may take other forms and may be movable in modes other than rotation. Thus, the movement may be that of translation past the scan line. An arrangement of this type is shown in Fig. 15–2 at page 389 of "High-Speed Computing Devices" by the staff of Engineering Research Associates, Inc., and which is hereby incorporated by reference into this application. According to the arrangement disclosed in this text, a digit-coded film is driven past the scan line along a path at right angles to the scan line. By coding the film in the manner outlined above in connection with the embodiment of Fig. 1, and by distributing the photosensitive elements about the scan line in accordance with the principles of the present invention, an equivalent arrangement may be attained.

Thus far, the present invention has been described in connection with a binary protractor of the optical type in which the energy transferred is in the form of light rays. It should be apparent, however, that the principle of operation of the present invention may be applied to systems employing other forms of electromagnetic energy and to other energy mediums. One such system employing electromagnetic energy generated by a coil is illustrated in Fig. 7.

Figure 7:
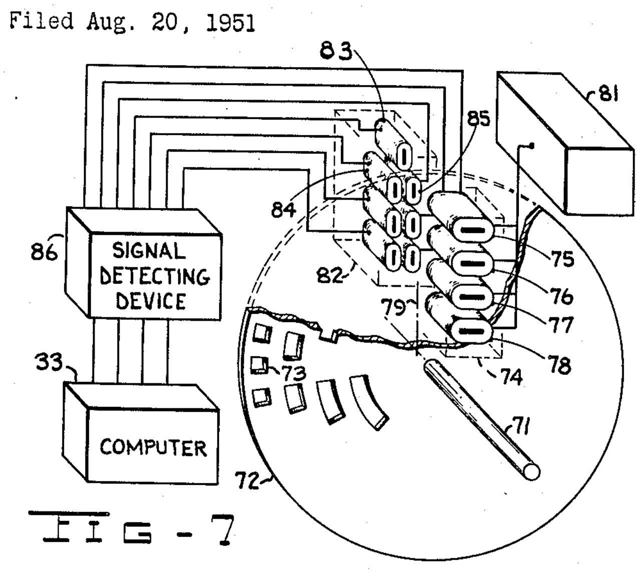
Fig. 7 is a perspective view of a modification of the embodiment of Fig. 1, which employs electromagnetic fields as the source of energy.

Referring now to Fig. 7, a shaft 71 is coupled to disk 72 to rotate disk 72, in a manner similar to that of the embodiment of Fig. 1. Disk 72 is made of any suitable metal, such as copper, and is calibrated with a plurality of holes or apertures, such as aperture 73, the calibration being identical to that of disk 12 of Fig. 2. Positioned on one side of disk 72 is a source of electromagnetic energy, generally designated 74, which comprises a plurality of coils 75 through 78. Coils 75 through 78 are aligned along a line 79 perpendicular to the axis of rotation of shaft 71. Coils 75 through 78 are connected to a source 81 of radio-frequency alternating current, and, when energized from source 81, generate an electromagnetic field in the direction of disk 72.

Positioned on the other side of disk 72 in alignment with line 79 is an electromagnetic energy sensing device, generally designated 82, which comprises a plurality of pickup coils, such as coils 83, 84 and 85. Coil 83 is positioned in alignment with line 79 and the apertures in disk 72 representing the least significant or "ones" digit of the binary number, while coils 84 and 85 are in alignment with the apertures in disk 72 representing the "twos" digit of the binary number. As in the embodiment of Figs. 1 and 2, coils 84 and 85 are positioned on opposite sides of line 79, for indicating the digit of the next lower and next higher number, respectively. Similar pairs of pickup coils are provided for each of the other digits of the number represented on disk 72.

Each of the pickup coils is electrically connected to a signal detecting device 86 for detecting the signals in the pickup coils. The output of device 86 is applied to the input register of a computer which is identical to computer 33 of Figs. 1 and 3, and is so designated. Device 86 is so arranged as to render one group of pickup coils operable to apply signals to computer 33, in accordance with the energization of coil 83.

Figure 8:
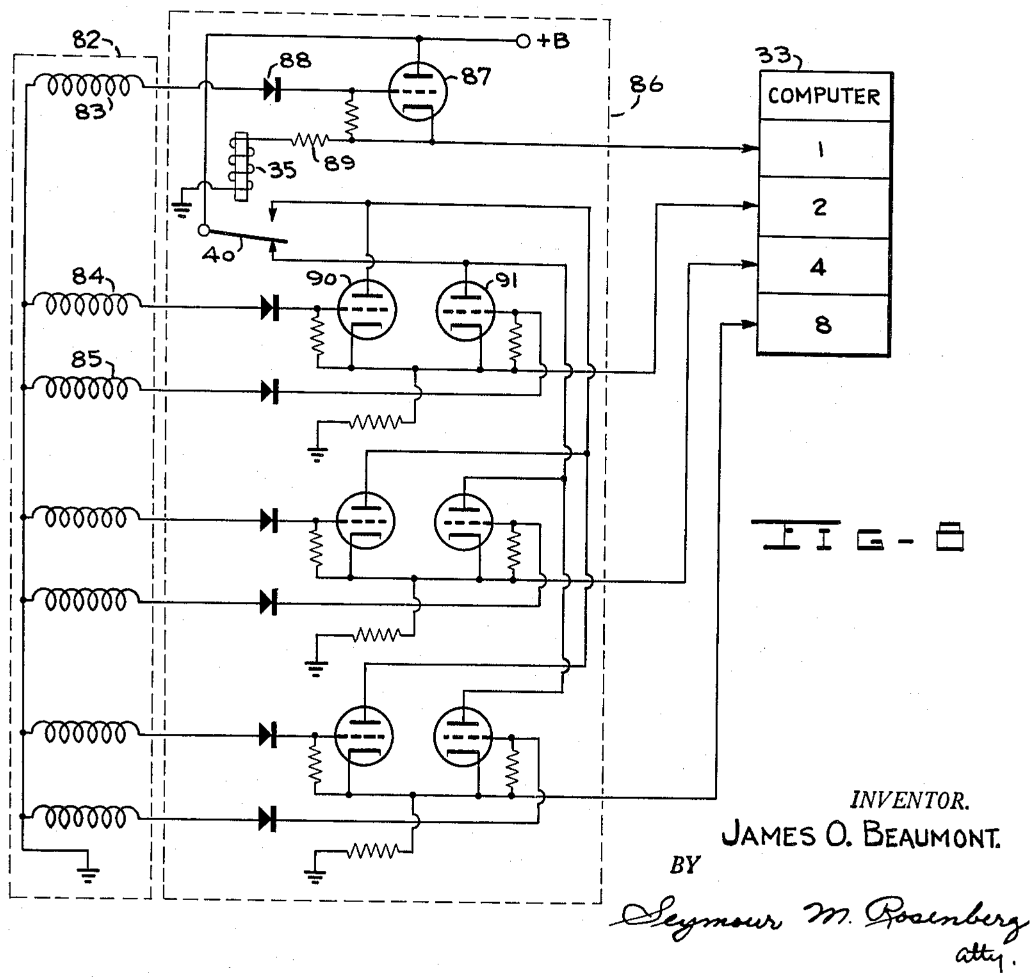
Fig. 8 is a circuit diagram of one form of indicating apparatus for use in the embodiment of Fig. 7.

Referring now to Fig. 8, there is shown one form of signal detecting device 86 suitable for use in the system of Fig. 7. Coil 83, the pickup coil for the "ones" digit, is coupled to the grid of a vacuum tube 87 through a rectifier, such as diode 88. Plate potential for tube 87 is supplied from the +B terminal of a source of direct-current potential, not shown, the other terminal of the source being grounded. The cathode of tube 87 is coupled to the 1 section of computer 33, and to one end of relay coil 35 through a resistor 89. Coils 84 and 85 are connected to the grids of vacuum tubes 90 and 91, respectively, the common cathode connection of tubes 90 and 91 being connected to the 2 section of computer 33. Similar connections are provided between each of the other pairs of pickup coils and the associated section of computer 33.

In operation, all of the tubes are biased beyond cut-off so that no signal is applied to computer 33 when the pickup coils are not energized. Plate potential is supplied from the +B terminal to the right bank of tubes, including tube 91, through relay armature 40, which is normally in the position shown in Fig. 8. As disk 72 rotates, the apertures therein will be aligned between source 74 and sensing device 82 and the magnetic field produced by source 74 will induce signals in the pickup coils of device 82. These signals, after rectification, are applied to the grids of the associated tubes to render the tubes conducting and thereby to indicate the digits of the binary number. As in the embodiment of Fig. 1, when the least significant digit is a 1, tube 87 will conduct and thereby energize relay coil 35. Thus, plate potential will be removed from the right bank of tubes, and be applied to the left bank of tubes, including tube 90.

Figure 9:
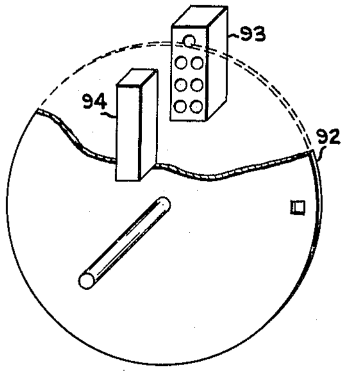
Fig. 9 is a perspective view of a modification of the embodiment of Fig. 1, in which nuclear radiations are employed as the source of energy.

It is thus seen that the system of Figs. 7 and 8 will operate in substantially the same manner as the optical type systems previously described. Referring now to Fig. 9, there is shown another embodiment of the present invention which the source of energy is a radioactive material. In Fig. 9, a source 94 of nuclear radiations is positioned to radiate nuclear particles at a calibrated disk 92 which is composed of metal having a plurality of holes or apertures therein, as disk 72 of Fig. 7. Disk 92 serves to shield a radiation sensing device 93 from the radiations from source 94, except at those instances when the apertures in disk 92 are aligned between source 94 and device 93.

Sensing device 93 comprises a plurality of individual radiation detectors aligned with respect to disk 92 in a manner identical with the alignment of the disk and pickup coils of the embodiment shown in Fig. 7. Each radiation detector may be an ionization chamber or a Geiger counter. Suitable circuits for these type of radiation detectors may be found on pages 24 and 26 of the text "Applied Nuclear Physics" by Ernest Pollard and William L. Davidson, published in 1947 by John Wiley & Sons, Inc. The output of the individual radiation detectors may be applied to the input register of a computer through a signal detecting circuit of the type illustrated in Fig. 8.

What is claimed as new is:

1. An optical binary protractor for converting the magnitude of the rotational angle of a shaft into a binary digital number having a plurality of digits, said converter comprising: a source of light; a binary-calibrated disk positioned in the path of the light from said source and being rotatable by the shaft, said disk having a plurality of spaced annular rings, one for each digit, each of said rings being provided with alternate areas transparent and opaque, respectively, to the light from said source; a photosensitive device responsive to the light transmitted through said disk for indicating the digits of the number, said device including a first photosensitive element positioned in alignment with one of said rings and with a radial line on said disk for indicating the digit associated with said one ring, and a plurality of pairs of photosensitive elements, one pair being operable to indicate the digit associated with each of the others of said plurality of rings, the elements of each of said pairs of photosensitive elements being positioned in alignment with their associated ring and on opposite sides of said radial line, respectively; and means responsive to energization of said first photosensitive element for selectively rendering operable one element of each of said pairs of photosensitive elements.

2. An optical binary protractor comprising a shaft whose rotational angle with respect to a predetermined reference line is to be indicated in the form of a binary number having a plurality of digits, said shaft being rotatable about an axis perpendicular to said reference line; a member mechanically coupled to said shaft for rotation therewith, said member being calibrated with first and second pluralities of areas transparent and opaque to illumination, respectively, the areas along any one line perpendicular to said axis representing, the digits, respectively, of the binary number corresponding to the angle between said one line and said reference line; means for illuminating said member; a first photosensitive element positioned in alignment with said reference line and responsive to the illumination transmitted by said member for indicating the least significant digit of the binary number; a plurality of pairs of photosensitive elements operable to indicate the other digits, respectively, of the binary number, the elements of each of said pairs being positioned on opposite sides of said reference line; and means responsive to energization of said first photosensitive element for selectively rendering operable one element of each of said pairs of photosensitive elements.

3. An optical rotational analogue-to-digital converter for indicating the magnitude of a function of the rotational angle of a shaft with respect to a predetermined reference line, the indication being presented in the form of a binary number having a plurality of digits, said converter comprising: a source of illumination; a disk rotatable about an axis perpendicular to the reference line and positioned in the path of the illumination from said source, said disk being calibrated with first and second pluralities of areas transparent and opaque, respectively, to the illumination from said source, the areas along any line on said disk perpendicular to said axis representing respectively, the digits of the binary number corresponding to the function of the rotational angle; means for mechanically coupling said disk to the shaft for rotation therewith; a first photosensitive element positioned in alignment with the reference line, said first photosensitive element being responsive to the illumination from said source transmitted through the area on said disk representing the least significant digit of the binary number for indicating said least significant digit; first and second groups of photosensitive elements positioned at points displaced from the reference line, said first and second groups of photosensitive elements being responsive to the illumination transmitted through said disk for indicating all but the least significant digit of the next higher and next lower binary numbers, respectively, when said first photosensitive element is aligned with the transition region between a transparent area and an opaque area on said disk; and circuit means responsive to energization of said first photosensitive element for selectively rendering operable one group of said first and second groups of photosensitive elements.

4. An optical rotational analogue-to-digital converter for indicating a function of the rotational angle of a shaft in the form of a binary number having a plurality of digits, said converter comprising: a source of illumination; a rotatable disk positioned in the path of the illumination from said source, said disk being calibrated with a plurality of groups of sections representing the plurality of digits, respectively, of binary numbers, each of said sections including pluralities of areas transparent and opaque, respectively, to the illumination from said source; means for mechanically coupling said disk to the shaft for rotation therewith; a first photosensitive element for indicating the least significant digit of the binary number to be indicated, said first element being responsive to the illumination from said source transmitted through an area of the group of sections representing the least significant digit, first and second banks of photosensitive elements for indicating all but the least significant digit of first and second binary numbers, respectively, when said first element is aligned with the transition region between a transparent area and an opaque area of the group of sections representing the least significant digit, said first and second numbers being one unit digit higher and one unit digit lower, respectively, than the binary number to be indicated; and circuit means responsive to energization of said first element for selectively rendering operable one bank of said first and second banks of elements.

5. An optical rotational analogue-to-digital converter for indicating a function of the rotational angle of a rotatable shaft in the form of a binary number having a plurality of digits, said converter comprising: a source of illumination; a rotatable member positioned in the path of the illumination from said source, said member being calibrated with a plurality of groups of sections representing the plurality of digits, respectively, of binary numbers, each of said sections including areas transparent to the illumination from said source; mechanical coupling means for rotating said member from the shaft; a first element for indicating the least significant digit of the binary number to be indicated, said first element being responsive to the illumination from said source transmitted through an area of the group of sections representing the least significant digit; first and second banks of elements, responsive to the illumination from said source transmitted through the others of said plurality of groups of sections of said member, for indicating all but the least significant digit of first and second binary numbers, respectively, said first and second banks of elements being so positioned relative to said first element and said member that said first and second numbers are the next higher and next lower, respectively, relative to the binary number to be indicated; and circuit means actuated by said first element for selectively rendering operable one bank of said first and second banks of elements.

6. An optical rotational analogue-to-digital converter for indicating a function of the rotational angle of a rotatable shaft in the form of a binary number having a plurality of digits, said converter comprising: means for directing illumination along a predetermined path; a member at least partially positioned in said path and movable past a predetermined line in said path, said member being provided with spaced areas transparent to the illumination, said areas being so arranged that the illumination passing through said member along said line, as said member passes said line, represents the digits of progressively higher binary numbers; means coupled to said member for moving said member in response to the rotation of the shaft; an element responsive to a portion of the illumination transmitted through said member for indicating the least significant digit of the binary number to be indicated; first and second devices, responsive to the illumination transmitted through said member, for indicating all but the least significant digit of the next higher and next lower binary numbers, respectively, relative to the binary number to be indicated; and means actuated by said element for selectively rendering operable one of said first and second devices.

7. A converter as defined in claim 6, wherein said second device is normally operable, and said means includes an electrical circuit responsive to energization of said element for simultaneously rendering said first device operable and said second device inoperable.

8. A rotational analogue-to-digital converter for indicating a function of the rotational angle of a rotatable shaft in the form of a binary number having a plurality of digits, said converter comprising: means for radiating energy along a predetermined path; a member positioned in said path and movable past a predetermined line in said path, said member having a plurality of spaced apertures therein, said apertures being so arranged that the energy transmitted through said member along said line, as said member passes said line, represents the digits of progressively higher binary numbers; means coupled to said member for moving said member in accordance with the rotation of the shaft; a first element responsive to the energy transmitted through said member for indicating the least significant digit of the binary number; first and second devices responsive to the energy transmitted through said member for indicating all but the least significant digit of first and second binary numbers, respectively, said first and second devices being so arranged relative to said first element and said member as to indicate the next higher and next lower binary number, respectively, whenever the indication on said first element is in the region of transition from one value to another; and means actuated by said first element for selectively rendering operable one of said first and second devices.

9. A rotational analogue-to-digital converter for indicating a function of the rotational angle of a rotatable shaft in the form of a binary number having a plurality of digits; said converter comprising: means for radiating energy along a predetermined path; a member positioned in said path and movable past a predetermined line in said path; said member being arranged to direct the energy along said line in the form of a pattern representing the digits of progressively higher binary numbers as said member passes said line; means for moving said member in accordance with the rotation of the shaft; an indicating device responsive to the pattern of energy from said member for indicating the digits of the binary number to be indicated, said device including a first element for incating the least significant digit of the number, and first and second banks of elements for indicating all but the least significant digit of first and second binary numbers, respectively, said first and second banks of elements being so arranged relative to said first element and said member that said first and second binary numbers are the next higher and next lower numbers, respectively, relative to the binary number to be indicated, whenever the indication on said first element is in the region of transition from one value to another; and means actuated by said first element for selectively rendering operable one of said first and second devices.

10. A rotational analogue-to-digital converter for indicating a function of the rotational angle of a rotatable member in the form of a binary number having a plurality of digits, said converter comprising means for radiating energy; a movable member for directing the energy in the form of patterns representing the digits of binary numbers, respectively, one pattern for each position of said movable member; means for moving said movable member in accordance with rotation of a rotatable member; an indicating device responsive to the pattern of energy from said movable member for indicating the digits of the binary number, said device including a first element for indicating the least significant digit of the binary number, and first and second banks of elements for indicating all but the least significant digit of the next higher and next lower binary numbers, respectively, whenever the indication of said first element is in the region of transition from one value to another, and means actuated by said first element for selectively rendering operable one of said first and second banks of elements.

11. In a binary protractor having a source of energy and a movable member which transmits therethrough a portion of the energy from the source, the portion of the energy transmitted by the member representing the digits of a binary number, a non-ambiguous indicating apparatus comprising: an element responsive to the energy transmitted through the member for indicating the least significant digit of the binary number represented; a first device responsive to the energy transmitted through the member for indicating all of the digits but the least significant digit of the next higher binary number, relative to the binary number represented; a second device responsive to the energy transmitted through the member for indicating all of the digits but the least significant digit of the next lower binary number, relative to the binary number represented; and means actuated by said element for selectively rendering operable one of said devices.

12. In a binary protractor having a source of energy and a movable member which transmits therethrough a portion of the energy from the source, the portion of the energy transmitted by the member representing the digits of a binary number, a nonambiguous indicating apparatus comprising: an element responsive to the energy transmitted through the member for indicating the least significant digit of the binary number represented; a first device responsive to the energy transmitted through the member for indicating all of the digits but the least significant digit of the next higher binary number, relative to the binary number represented, said first device being normally inoperable; a second device responsive to the energy transmitted through the member for indicating all of the digits but the least significant digit of the next lower binary number, relative to the binary number represented; said second device being normally operable and means responsive to energization of said element for simultaneously rendering said first device operable and said second device inoperable.

13. In a binary protractor having a source of energy and a movable member which transmits a portion of the energy from the source, the portion of the energy transmitted by the member representing, at any instant, the digits of a binary number, a nonambiguous indicating apparatus comprising: an element responsive to the energy transmitted by the member for indicating the least significant digit of the binary number represented; a first device responsive to the energy transmitted by the member for indicating all of the digits but the least significant digit of the next higher binary number, relative to the binary number represented; a second device reponsive to the energy transmitted by the member for indicating all of the digits but the least significant digit of the next lower binary number, relative to the binary number represented; and means actuated by said element for selectively rendering operable one of said devices.

14. The indicating apparatus defined in claim 13, wherein said second device is normally operable, and said means includes an electrical circuit responsive to energization of said element for simultaneously rendering said first device operable and said second device inoperable.

15. In a binary protractor having a source of energy and a movable member which transmits therethrough a portion of the energy from the source, the portion of the energy transmitted by the member representing the digits of the binary number, a nonambiguous indicating apparatus comprising: a first element responsive to the energy transmitted through the member for indicating the least significant digit of the binary number represented; a second element responsive to the energy transmitted through the member, said second element selectively operable for indicating the next-to-least significant digit of the next higher binary number, relative to the binary number represented; a third element responsive to the energy transmitted through the member, said third element being selectively operable for indicating the next-to-least significant digit of the next lower binary number, relative to the binary number represented; and means actuated by said first element for selectively rendering operable one of said second and third elements.

16. In an optical binary protractor for converting the magnitude of the rotational angle of a shaft into a binary digital number having a plurality of digits, the combination comprising: a source of light; a binary-calibrated disk positioned in the path of the light from said source and being rotatable by the shaft, said disk having at least first and second spaced annular rings corresponding to the least significant and next-to-least significant digits, respectively, of the binary number, each of said rings being provided with alternate areas transparent and opaque, respectively, to the light from said source; a first photosensitive device responsive to the light transmitted through said first ring of said disk for indicating the least significant digit of the number; a pair of selectively operable photosensitive devices responsive to the light transmitted through said second ring for indicating the next-to-least significant digit of the next higher and next lower binary numbers, respectively, relative to the binary number to be indicated; and means actuated by said first phtosensitive device for selectively rendering operable one of said pair of selectively operable photosensitive devices.

References Cited in the file of this patent

UNITED STATES PATENTS

| | | |
|---|---|---|
| 2,281,350 | Bryce | Apr. 28, 1942 |
| 2,302,025 | Gould | Nov. 17, 1942 |
| 2,318,591 | Couffignal | May 11, 1943 |
| 2,436,178 | Rajchman | Feb. 17, 1948 |
| 2,533,242 | Gridley | Dec. 12, 1950 |
| 2,537,427 | Seid et al. | Jan. 9, 1951 |